US008185682B2

(12) United States Patent
Bandholz et al.

(10) Patent No.: US 8,185,682 B2
(45) Date of Patent: May 22, 2012

(54) USB 2.0 BI-DIRECTIONAL BUS CHANNEL WITH BOOST CIRCUITRY

(75) Inventors: Justin P. Bandholz, Cary, NC (US); Robert J. Christopher, Chapel Hill, NC (US); Joseph M. Jacobs, Mebane, NC (US); Pravin Patel, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 1390 days.

(21) Appl. No.: 11/756,656

(22) Filed: Jun. 1, 2007

(65) Prior Publication Data
US 2008/0301347 A1 Dec. 4, 2008

(51) Int. Cl.
*G06F 13/14* (2006.01)
(52) U.S. Cl. ............................ 710/305; 710/313; 710/17
(58) Field of Classification Search .......... 710/300–317, 710/104–105, 110–112, 62–64, 72, 7–19, 710/20, 36
See application file for complete search history.

(56) References Cited

U.S. PATENT DOCUMENTS

| 6,119,190 | A  | * | 9/2000  | Garney ........................ 710/310 |
| 6,237,107 | B1 |   | 5/2001  | Williams |
| 6,288,666 | B1 |   | 9/2001  | Afghahi |
| 6,633,583 | B1 | * | 10/2003 | Esterson ....................... 370/466 |
| 6,640,270 | B1 | * | 10/2003 | Wang .............................. 710/69 |
| 6,654,565 | B2 | * | 11/2003 | Kenny ........................... 398/182 |
| 6,751,315 | B1 | * | 6/2004  | Liu et al. .................. 379/413.02 |
| 6,838,943 | B2 |   | 1/2005  | Zamir |
| 7,028,126 | B1 | * | 4/2006  | Liang ............................ 710/301 |
| 7,076,225 | B2 |   | 7/2006  | Li |
| 7,254,159 | B1 | * | 8/2007  | Lavelle et al. ................ 375/141 |
| 7,315,216 | B2 | * | 1/2008  | Yang et al. ....................... 331/25 |
| 2003/0122617 | A1 |   | 7/2003  | Johnston |
| 2004/0090253 | A1 |   | 5/2004  | McNitt |
| 2009/0089347 | A1 | * | 4/2009  | Pomet et al. .................. 708/250 |

OTHER PUBLICATIONS

Analog Dialogue, [online]; [retrieved on May 6, 2007]; retrieved from the Internet http://www.analog.com/analogdialogue, Eva Murphy, Padraig Fitzgerald "Switching in USB Consumer Applications" Analog Dialogue, Jan. 2006, 7p, vol. 40-01.
Everything USB, [online]; [retrieved on May 6, 2007]; retrieved from the Internet http://www.everythingusb.com/usb2/faq.htm, Ian Chiu, William DeVercelly et al., "USB 2.0, Hi Speed USB FAQ", Everything USB, Aug. 31, 2006, 6p.
Wikipedia, [online]; [retrieved on May 6, 2007]; retrieved from the Internet http://en.wikipedia.org/wiki/NRZI, "Non-return-to-zero, inverted", 1p.
Wikipedia, [online]; [retrieved on May 6, 2007]; retrieved from the Internet http://en.wikipedia.org/wiki/Universal_Serial_Bus, "Universal Serial Bus", 12p.

* cited by examiner

*Primary Examiner* — Raymond Phan
(74) *Attorney, Agent, or Firm* — Cantor Colburn LLP

(57) ABSTRACT

A system for allowing a designer to implement Universal Serial Bus (USB) 2.0 in topologies not anticipated by a USB 2.0 specification and with reduced channel losses, the system comprising: a bus channel having a plurality of electrical elements; and a boost circuit connected at a predetermined location on the bus channel; a plurality of USB signals transmitted through the system; wherein edges of the plurality of USB signals are boosted without impacting the bi-directional nature of the bus channel.

8 Claims, 3 Drawing Sheets

PRIOR ART

USB 2.0 BI-DIRECTIONAL BUS CHANNEL WITH BOOST CIRCUITRY

TRADEMARKS

IBM® is a registered trademark of International Business Machines Corporation, Armonk, N.Y., U.S.A. Other names used herein may be registered trademarks, trademarks or product names of International Business Machines Corporation or other companies.

BACKGROUND OF THE INVENTION

1. Field of the Invention

This invention relates to Universal Serial Bus (USB) 2.0 point-to-point protocols, and particularly to a system and method for allowing a designer to implement USB 2.0 in topologies not anticipated by the USB 2.0 specification and without channel losses that would cause the received signal to fail the USB receive eye mask.

2. Description of Background

Universal Serial Bus (USB) 2.0 is a complete overhaul of the Universal Serial Bus input/output bus protocol, which allows much higher speeds than the older USB 1.1 standard did. The goal of the USB 2.0 serial bus is to broaden the range of external peripherals that can be used on a computer. A hard drive can easily hit the USB 1.1 bottleneck whereas it now becomes more usable under USB 2.0 conditions.

USB 2.0 is a point-to-point protocol that makes certain assumptions about physical interconnect of the two agents. The two agents are typically connected through a cable with only minimal amounts of trace on a printed circuit board (PCB). In an environment such as the BladeCenter® chassis it is desirable to drive USB 2.0 over many inches of FR4 (24") with multiple passive Field Effect Transistor (FET) switches and connectors in the path. Because of longer distances through FR4 and because of the intervening devices in the path, the resulting transmission channel is very lossy and likely does not meet the required USB receiver eye mask.

IBM BladeCenter® offers a broad range of storage and networking options integrated into the chassis to simplify infrastructure complexity and manageability while lowering total cost of ownership. IBM BladeCenter® supports a wide selection of processor technologies and operating systems to allow clients to run all of their diverse work loads inside a single architecture. Reducing complexity, improving systems management, and increasing flexibility while driving down total cost of ownership are key solutions. FR-4, an abbreviation for Flame Resistant 4, is a type of material used for making a PCB. It describes the board itself with no copper covering.

There are some solutions available to solve the problem of a lossy channel. Some of these solutions include: 1) Adding a USB hub to the middle of the channel. This would require adding a complex Application Specific Integrated Circuit (ASIC) and associated circuitry to the backplane. 2) Incorporating pre-emphasis to USB transmitters and equalization (EQ) to USB receivers. Neither pre-emphasis nor EQ are specified in the USB 2.0 and both endpoints must support these features, thus the user of these features would have limited operability. 3) Transmission line matching network. This is typically only useful to combat specific discontinuities. Using passive filter networks to compensate for FR4 loss usually requires a boost in transmit voltage to overcome the loss in the filter. USB 2.0 does not specify a variable transmit voltage. 4) Installing USB range extenders. These devices are conceptually USB hubs with a non-USB interconnect in between them and have the same disadvantages as USB hubs. Therefore, these four solutions are not effective in dealing with the problem of lossy channels.

Considering the above limitations, it is desired to have a method for allowing a designer to implement USB 2.0 in topologies not anticipated by the USB 2.0 specification and without channel losses that would cause the received signal to fail the USB receive eye mask.

SUMMARY OF THE INVENTION

The shortcomings of the prior art are overcome and additional advantages are provided through the provision of a system for allowing a designer to implement Universal Serial Bus (USB) 2.0 in topologies not anticipated by a USB 2.0 specification and with reduced channel losses comprising: a bus channel having a plurality of electrical elements; and a boost circuit connected at a predetermined location on the bus channel; a plurality of USB signals transmitted through the system; wherein edges of the plurality of USB signals are boosted without impacting the bi-directional nature of the bus channel.

The shortcomings of the prior art are overcome and additional advantages are provided through the provision of a method for allowing a designer to implement Universal Serial Bus (USB) 2.0 in topologies not anticipated by a USB 2.0 specification, the method comprising: a bus channel having a plurality of electrical elements and a boost circuit connected at a predetermined location on the bus channel in order to reduce channel losses by implementing the steps of: transmitting through the system a plurality of USB signals; and minimizing path delays and hub hops; wherein edges of the plurality of USB signals are boosted without impacting the bi-directional nature of the bus channel.

Additional features and advantages are realized through the techniques of the present invention. Other embodiments and aspects of the invention are described in detail herein and are considered a part of the claimed invention. For a better understanding of the invention with advantages and features, refer to the description and the drawings.

TECHNICAL EFFECTS

As a result of the summarized invention, technically we have achieved a solution by a method for allowing a designer to implement USB 2.0 in topologies not anticipated by the USB 2.0 specification and without channel losses that would cause the received signal to fail the USB receive eye mask.

BRIEF DESCRIPTION OF THE DRAWINGS

The subject matter, which is regarded as the invention, is particularly pointed out and distinctly claimed in the claims at the conclusion of the specification. The foregoing and other objects, features, and advantages of the invention are apparent from the following detailed description taken in conjunction with the accompanying drawings in which:

DETAILED DESCRIPTION OF THE INVENTION

Figure 1:
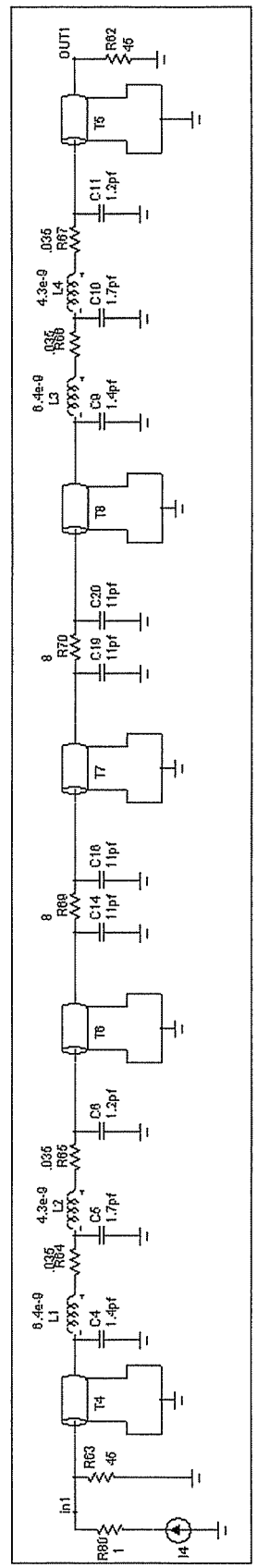
FIG. 1 is a schematic diagram of a traditional channel model.

One aspect of the exemplary embodiments is a method for allowing a designer to implement Universal Serial Bus (USB)

2.0 in topologies not anticipated by the USB 2.0 specification and without channel losses that would cause the received signal to fail the USB receive eye mask. In another exemplary embodiment, a booster circuit attaches to the USB channel mid bus and boosts the signal. Unlike a USB hub, the exemplary embodiments do not electrically isolate the two agents so that path delays and hub hops are kept to a minimum. In contrast, the exemplary embodiments are transparent to the functional operation of the bus.

The exemplary embodiments of the present invention operate by boosting the edges of the USB signaling. To successfully accomplish this task, the exemplary embodiments are compatible with all the USB signaling protocols, including slow speed, full speed, and high speed. A Low Speed rate is a rate of up to 1.5 Mbit/s (187.5 kB/s) that is mostly used for Human Interface Devices (HID). A Full Speed rate is a rate of up to 12 Mbit/s (1.5 MB/s). Full Speed was the fastest rate before the USB 2.0 specification and many devices fall back to Full Speed. Full Speed devices divide the USB bandwidth between them in a first-come first-served basis and it is not uncommon to run out of bandwidth with several isochronous devices. A Hi-Speed rate is a rate of up to 480 Mbit/s (60 MB/s).

Moreover, USB signals are transmitted on a twisted pair of data cables, labelled D+ and D−. These collectively use half-duplex differential signaling to combat the effects of electromagnetic noise on longer lines. D+ and D− usually operate together because they are not separate simplex connections. Transmitted signal levels are 0.0-0.3 volts for low and 2.8-3.6 volts for high. The exemplary embodiments do not interfere with special bus events such as connects and disconnects. Since USB is a current mode bus, a termination resistance determines the voltage level. Furthermore, the exemplary embodiments do not add any additional DC load that would affect the signaling levels.

Concerning the USB receive eye mask, USB standards call for stringent tests to ensure that signals are handled in conformance with their requirements. One of the key tests is an "eye" diagram. This is an intuitive visual test, which can tell a lot about the signal's quality. An eye diagram is generated by probing a varying digital signal, plotting it versus sweeps of one or more cycles, and setting the scope for long persistence. The result is that all possible bit permutations are overlaid on a single view, showing the range of deviations from an ideal "eye" pattern in amplitude, phase, and rise- and fall times. Therefore, the signals D+ and D− are probed, and then overlaid on the scope, generating the eye diagram. The eye opening is then compared with a mask of the required shape to allow the viewer to see if the signal quality complies with the USB standard. According to the USB specification, if the signal crosses the boundaries of the mask, the device fails on signal integrity. In addition, if the USB controller's output-signal eye diagram has little passing margin or already fails the USB eye mask requirement, adding a switch will not result in successful eye compliance. To improve the eye, the output drive of the controller should be increased, or board-layout issues should be resolved, before the switch is incorporated. One solution presented herein is to add a booster circuit mid bus and boost the signal.

Referring to FIG. 1, a schematic diagram of a traditional channel model is illustrated. The circuit 10 shows several circuit elements (e.g., resistors, inductors, capacitors, etc.) connected in series and in parallel. This type of channel is a lossy channel because of the number of path delays.

Figure 2:
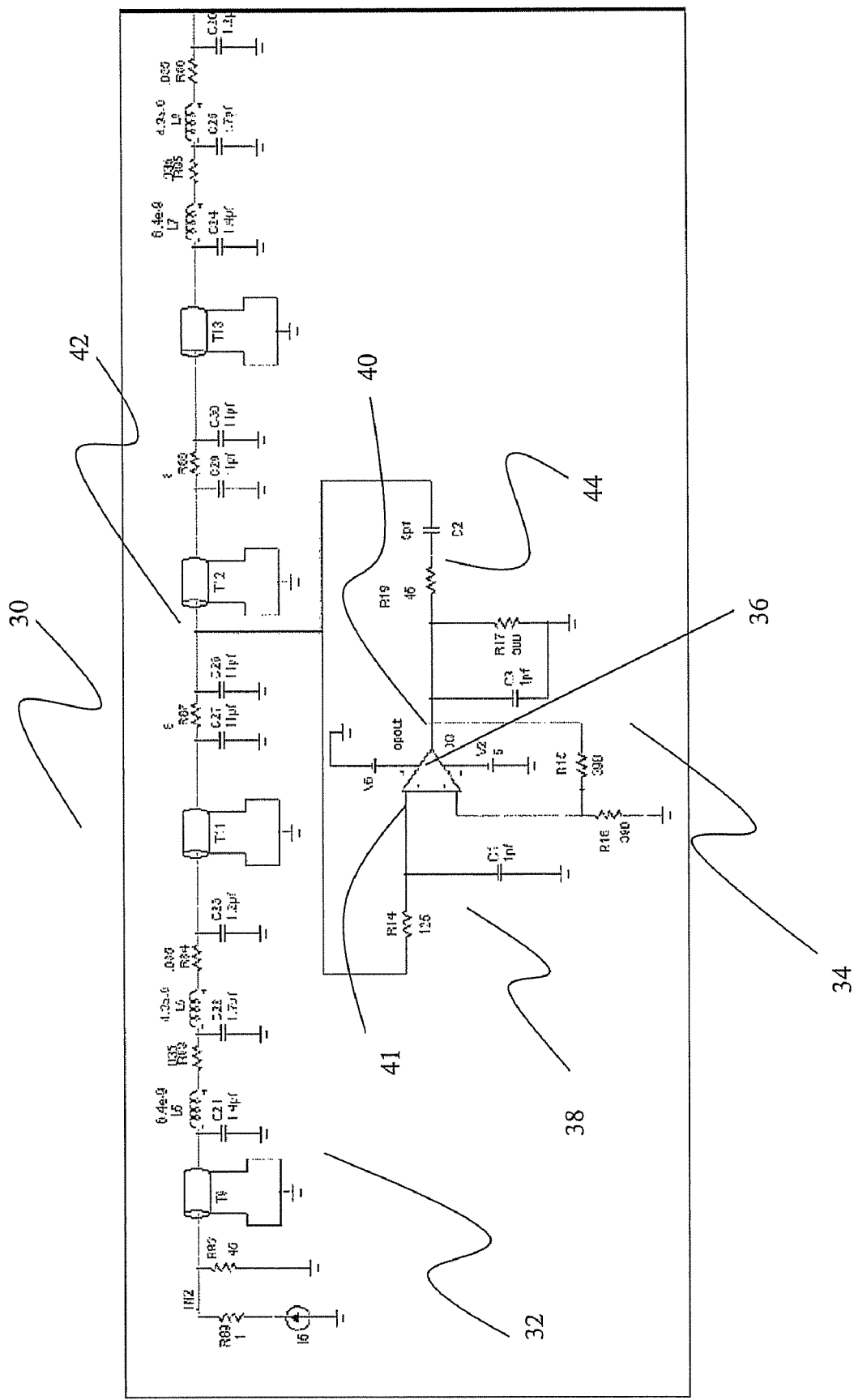
FIG. 2 is a schematic diagram of a channel model with a Universal Serial Bus (USB) boost circuit, in accordance with the exemplary embodiments of the present invention.

Referring to FIG. 2, a schematic diagram of a channel model with a Universal Serial Bus (USB) boost circuit, in accordance with the exemplary embodiments of the present invention is illustrated. The layout 30 includes a boost circuit 34 connected to the USB channel 32 in a look aside fashion so as to not impact the bidirectional nature of the bus. The boost circuit 34 includes an op-amp 36 configured in a non-inverting manner, an input filter 38 (R14, C1) coupled to the op-amp 36, and an output 40 from the op-amp 36, and a high-pass output filter 44.

The circuit 34 is replicated for the P and N sides of the channel 32. The output 40 of the amplifier 36 is connected to the USB channel 32 at location 42. The input filter 38 (R14, C1) is connected to the non-inverting side 41 of the op-amp 36. The function of the input filter 38 is to ensure that the positive feedback from the output 40 does not result in oscillations. A corner frequency is chosen to pass the $5^{th}$ harmonic of the USB signals (e.g., 1200 MHz). The amplifier is configured with negative feedback with an exemplary gain of 2 (R15, R16). The gain can be changed to compensate for differing levels of loss. The output 40 of the amplifier 36 is coupled to the USB channel 32 at location 42 through a high pass filter 44 (R18, C2). The cutoff frequency of the high pass filter 44 is set to the $3^{rd}$ harmonic (e.g., 720 MHz).

The high pass filter 44 performs two important tasks. First, it AC (Alternating Current) couples the output 40 of the amplifier 36 to the USB channel 32. This ensures that the Direct Current (DC) level of the op-amp output 40 does not affect the steady state voltage on the bus. Only the transitions are passed through. Second, referring to FIG. 3, the high pass filter 44 only allows very fast edges through allowing a modification of the high-speed edge rate without affecting slow speed signaling, full speed signaling, and special bus events.

Figure 3:
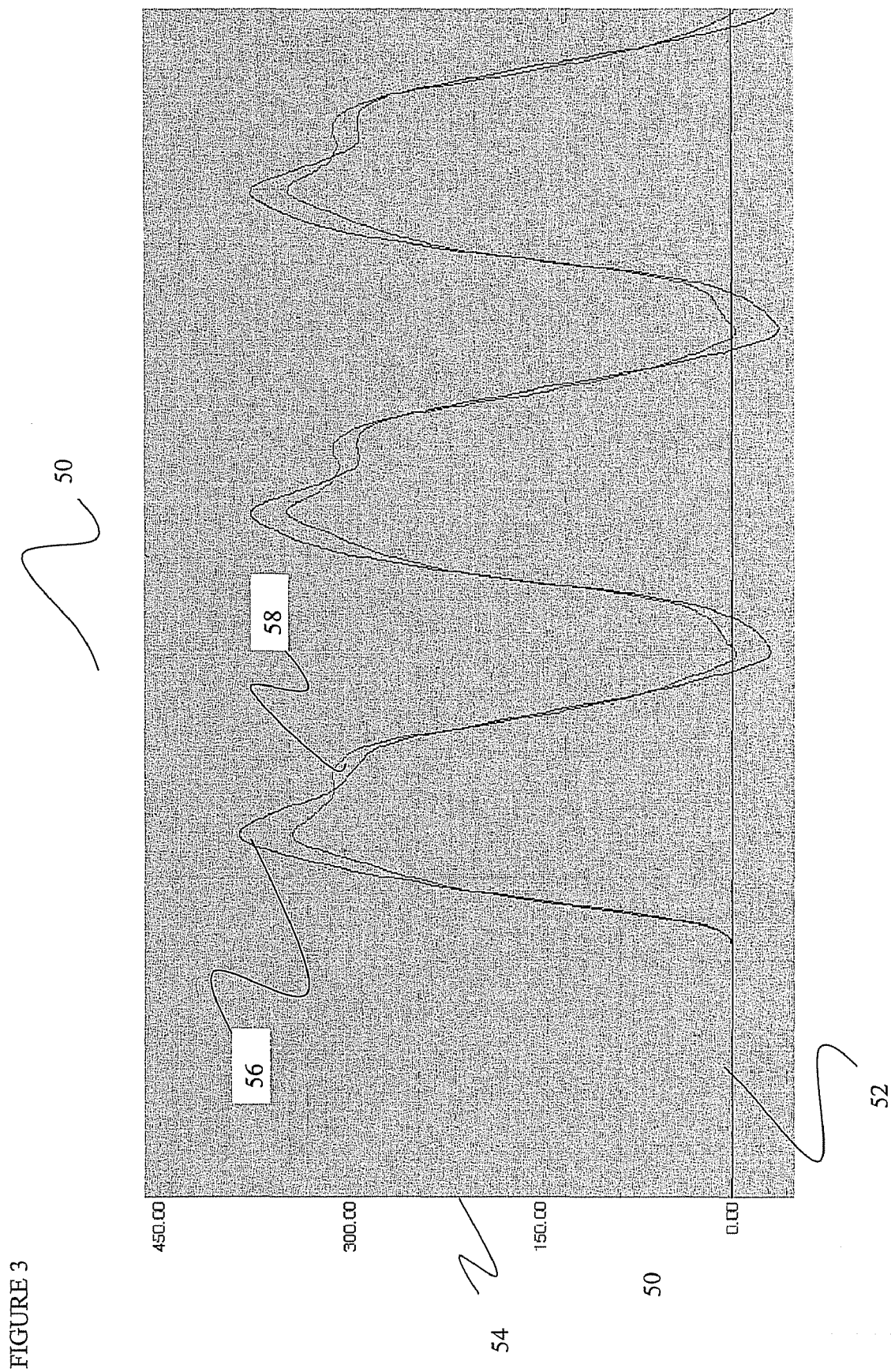
FIG. 3 is a graph illustrating a simulation of the USB boost circuit of FIG. 2, in accordance with the exemplary embodiments of the present invention.

FIG. 3 shows a graph 50 illustrating a simulation of the USB boost circuit of FIG. 2, in accordance with the exemplary embodiments of the present invention. The resistor value of the high pass filter 44 is chosen to match the impedance of the bus to reduce the likelihood of reflections. Since the output 40 is AC coupled, no intentional current flows out of the op-amp 36. The load resistor R17 ensures that the op-amp 36 remains stable during operation. Capacitor C3 is used to generate a small amount of high frequency peaking. The x-axis 52 of graph 50 denotes time, whereas the y-axis 54 of graph 50 denotes current (I). Signal 56 denotes the current output when the USB booster circuit 34 is connected to the channel model 32. Signal 58 denotes the current output when no USB booster circuit 34 is connected to the channel model 32.

The capabilities of the present invention can be implemented in software, firmware, hardware or some combination thereof.

As one example, one or more aspects of the present invention can be included in an article of manufacture (e.g., one or more computer program products) having, for instance, computer usable media.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A system for allowing a designer to implement Universal Serial Bus (USB) 2.0 in topologies not anticipated by a USB 2.0 specification and with reduced channel losses, the system comprising:
   a bus channel having a plurality of electrical elements;
   a boost circuit connected at a predetermined location on the bus channel, the boost circuit comprising operational amplifier, an input filter, and a high-pass output filter, wherein the high-pass output filter couples, by alternating current (AC), an output of the operational amplifier to the predetermined location of the bus channel and allows only very fast edges to pass through; and wherein the boost circuit is configured so as to boost edges of a plurality of USB signals transmitted through the system without impacting the bi-directional nature of the bus channel.

2. The system of claim 1, wherein the predetermined location is the middle of the bus channel.

3. The system of claim 1, wherein a cutoff frequency of the high-pass output filter is set to a $3^{rd}$ harmonic.

4. The method of claim 1, The system of claim 3, wherein a corner frequency is chosen to pass a $5^{th}$ harmonic of the plurality of USB signals.

5. A method for allowing a designer to implement Universal Serial Bus (USB) 2.0 in topologies not anticipated by a USB 2.0 specification, the method comprising:

a bus channel having a plurality of electrical elements and a boost circuit connected at a predetermined location on the bus channel in order to reduce channel losses by implementing the steps of:

transmitting through the system a plurality of USB signals; and minimizing path delays and hub hops;

wherein edges of the plurality of USB signals are boosted without impacting the bi-directional nature of the bus channel;

wherein the boost circuit comprises an operational amplifier, an input filter, and a high-pass output filter, wherein the high-pass output filter couples, by alternating current (AC), an output of the operational amplifier to the predetermined location of the bus channel and allows only very fast edges to pass through.

6. The method of claim 5, wherein the predetermined location is the middle of the bus channel.

7. The method of claim 5, wherein a cutoff frequency of the high-pass filter is set to a $3^{rd}$ harmonic.

8. The method of claim 5, wherein a corner frequency is chosen to pass a $5^{th}$ harmonic of the plurality of USB signals.

* * * * *